UNITED STATES PATENT OFFICE.

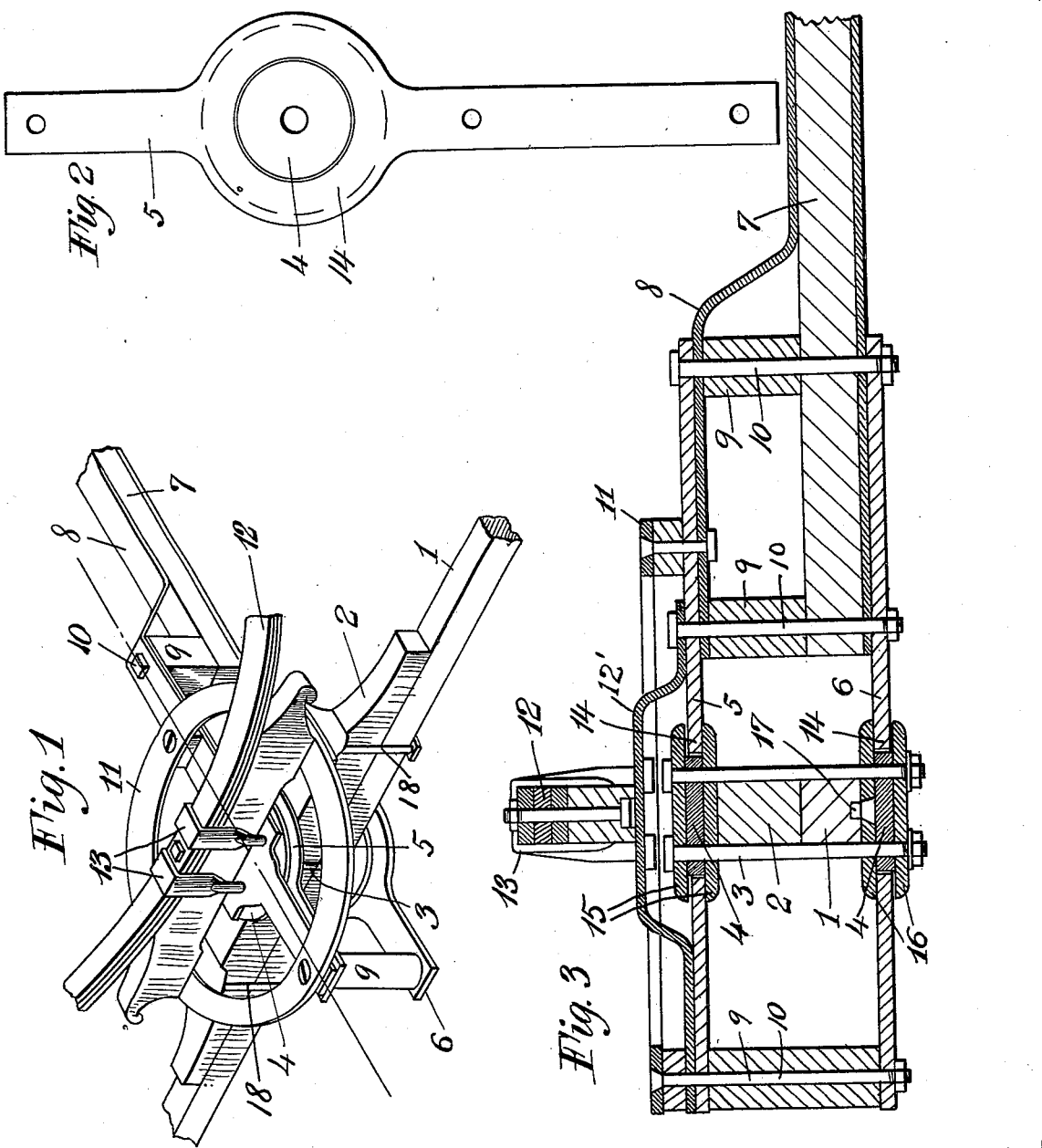

GEORGE HENRY BRACKMAN, OF FORKSVILLE, PENNSYLVANIA.

KING-BOLT.

1,098,089.  Specification of Letters Patent.  Patented May 26, 1914.

Application filed October 6, 1913. Serial No. 793,524.

*To all whom it may concern:*

Be it known that I, GEORGE HENRY BRACKMAN, a citizen of the United States, and resident of Forksville, in the county of Sullivan and State of Pennsylvania, have invented certain new and useful Improvements in King-Bolts, of which the following is a specification.

My invention relates to king bolts, and particularly to center draft king bolts.

More specifically, my invention relates to a center draft king bolt for front axles of vehicles, comprising a pair of relatively long plates, each having an annular portion intermediate its ends, circular plates carried by the axle and adapted to revolve within said circular openings of the respective plates, coöperating with retaining plates for keeping said circular plates in position as the axle is turned.

My invention will be more fully understood from the following description and the accompanying drawings, in which—

Figure 1 is a front perspective view of the front axle of a carriage or wagon provided with my invention; Fig. 2 a detail view of one pair of plates and coöperating circular plate or disk; and Fig. 3 a central sectional elevation of Fig. 1, on a somewhat enlarged scale.

Referring to the drawings, the front axle 1 with the reinforcing strip 2 is clamped by bolts or staples 3, 3 to the turn disks or circular plates 4, 4. The longitudinal plates 5, 6 extend respectively from the reach 7, the lower plate 6 being shown extending directly from the reach 7, and the upper plate 5 extending from the reach plate 8, the plates 5, 6 being spaced apart from one another by the space blocks 9, 9, 9 and bolts 10. Above the upper plate 5 is arranged the circle iron 11, and I preferably employ the central retaining plate 12′ extending from the outermost bolt 10 to the intermediate bolt 10, and to which the springs 12 are secured by the staples 13, 13.

The upper disk, or circular plate 4 is positioned within the opening of the annular portion 14 of upper plate 5, and is retained in position preferably by retaining plates 15, 15. The lower disk, or circular plate 4 is similarly retained within the opening of the annular portion 14 of the lower plate 6 by retaining plates 16, 16. As shown, the lower plate 16 is preferably provided with an upwardly extending lug 17 adapted to be received in a recess on the lower face of the axle 1. The axle 1, strip 2, disks 4, 4 and respective pairs of retaining plates 15, 15, and 16, 16 are held together by bolts or staples 3, 3, reinforced by the outside staples 18, 18.

It will be noted that by means of my king bolt construction, the axle is rigidly held in proper relation to the vehicle, and all twisting is substantially precluded; also the axle will be turned with minimum friction. The parts of construction may be easily inspected and lubricated, and the whole readily assembled.

While I have illustrated my invention by illustrating a single embodiment thereof, it will be understood that many changes may be made without departing from my invention.

Having thus described my invention, I declare that what I claim as new and desire to secure by Letters Patent, is:—

1. In a vehicle, the combination with a rotatable axle and the reach, of disks carried by said rotatable axle, a plurality of plates carried by said reach, said plates having openings respectively receiving said disks, and means secured to said rotatable axle for retaining said disks within the openings of said plates while permitting said disks to be turned upon the rotation of said axle.

2. In a vehicle, the combination with the front turnable axle, of a reach having an extension projecting above and in front of said axle, a body spring carried by said extension, a pair of plates carried by said reach, each of said plates having an opening, disks carried by said axle and respectively disposed within the openings of said plates, means for retaining said disks in position within said openings while permitting rotation of said disks therein, and means for interconnecting the front portion of said extension and the front portion of one of said plates.

Signed at Forksville in the county of Sullivan and State of Pennsylvania this 23rd day of September, A. D. 1913.

GEORGE HENRY BRACKMAN.

Witnesses:
 F. S. WORDEN,
 J. H. PLOTTS.

Copies of this patent may be obtained for five cents each, by addressing the "Commissioner of Patents, Washington, D. C."